United States Patent
Ying et al.

(10) Patent No.: US 7,684,549 B2
(45) Date of Patent: Mar. 23, 2010

(54) SYSTEM AND METHOD FOR MANAGING MESSAGES IN A PACKETIZED VOICE ENVIRONMENT

(75) Inventors: Goangshiuan Shawn Ying, Oakland, CA (US); Eugene L. Edmon, Danville, CA (US)

(73) Assignee: AT&T Intellectual Property I, LP, Reno, NV (US)

( * ) Notice: Subject to any disclaimer, the term of this patent is extended or adjusted under 35 U.S.C. 154(b) by 601 days.

(21) Appl. No.: 10/887,210

(22) Filed: Jul. 8, 2004

(65) Prior Publication Data

US 2006/0008059 A1   Jan. 12, 2006

(51) Int. Cl.
   *H04M 1/64* (2006.01)
(52) U.S. Cl. .................... 379/88.17; 370/352
(58) Field of Classification Search .............. 379/88.17, 379/88.23, 88.25, 88.18, 88.22, 142.06; 370/352
   See application file for complete search history.

(56) References Cited

U.S. PATENT DOCUMENTS

| | | | | |
|---|---|---|---|---|
| 4,935,954 A | * | 6/1990 | Thompson et al. | 379/88.04 |
| 5,172,404 A | * | 12/1992 | Hashimoto | 379/88.18 |
| 5,283,818 A | * | 2/1994 | Klausner et al. | 379/88.25 |
| 5,644,629 A | * | 7/1997 | Chow | 379/142.07 |
| 5,675,507 A | * | 10/1997 | Bobo, II | 709/206 |
| 5,822,405 A | * | 10/1998 | Astarabadi | 379/88.04 |
| 5,826,026 A | * | 10/1998 | Friedman | 709/217 |
| 5,894,505 A | * | 4/1999 | Koyama | 379/67.1 |
| 6,282,269 B1 | * | 8/2001 | Bowater et al. | 379/88.17 |
| 6,337,858 B1 | * | 1/2002 | Petty et al. | 370/356 |
| 6,434,143 B1 | * | 8/2002 | Donovan | 370/356 |
| 6,615,236 B2 | * | 9/2003 | Donovan et al. | 709/203 |
| 6,621,800 B1 | * | 9/2003 | Klein | 370/282 |
| 6,987,765 B2 | * | 1/2006 | March et al. | 370/392 |
| 7,050,447 B2 | * | 5/2006 | Silverman et al. | 370/412 |
| 2001/0000826 A1 | * | 5/2001 | Bellamy | 725/110 |
| 2002/0162116 A1 | * | 10/2002 | Read et al. | 725/106 |
| 2003/0125021 A1 | * | 7/2003 | Tell et al. | 455/426 |
| 2003/0142795 A1 | * | 7/2003 | Gavette et al. | 379/67.1 |

OTHER PUBLICATIONS

Voice Over IP by Uyless Black, Published by Prentice Hall, Jun. 2000.*
International Search Report for International Patent No. PCT/US05/23790, mailed on Sep. 21, 2006.
Written Opinion of the International Searching Authority for PCT/US05/23790, mailed on Sep. 21, 2006.

* cited by examiner

*Primary Examiner*—Simon Sing
(74) *Attorney, Agent, or Firm*—Toler Law Group

(57) ABSTRACT

A system and method are disclosed for managing messages in a packetized voice environment. A system incorporating teachings of the present disclosure may include a Voice over Internet Protocol (VoIP) telephone. The VoIP telephone may include an interface for communicatively coupling with a broadband network access device. The VoIP telephone may also include an answering machine module that is capable of initiating the answering of an incoming VoIP call, the playing of a recorded announcement to a calling party, and the saving of a message from the calling party. In some embodiments, the answering machine module may be integral with the VoIP telephone and the saved message may be stored on a local memory.

14 Claims, 4 Drawing Sheets

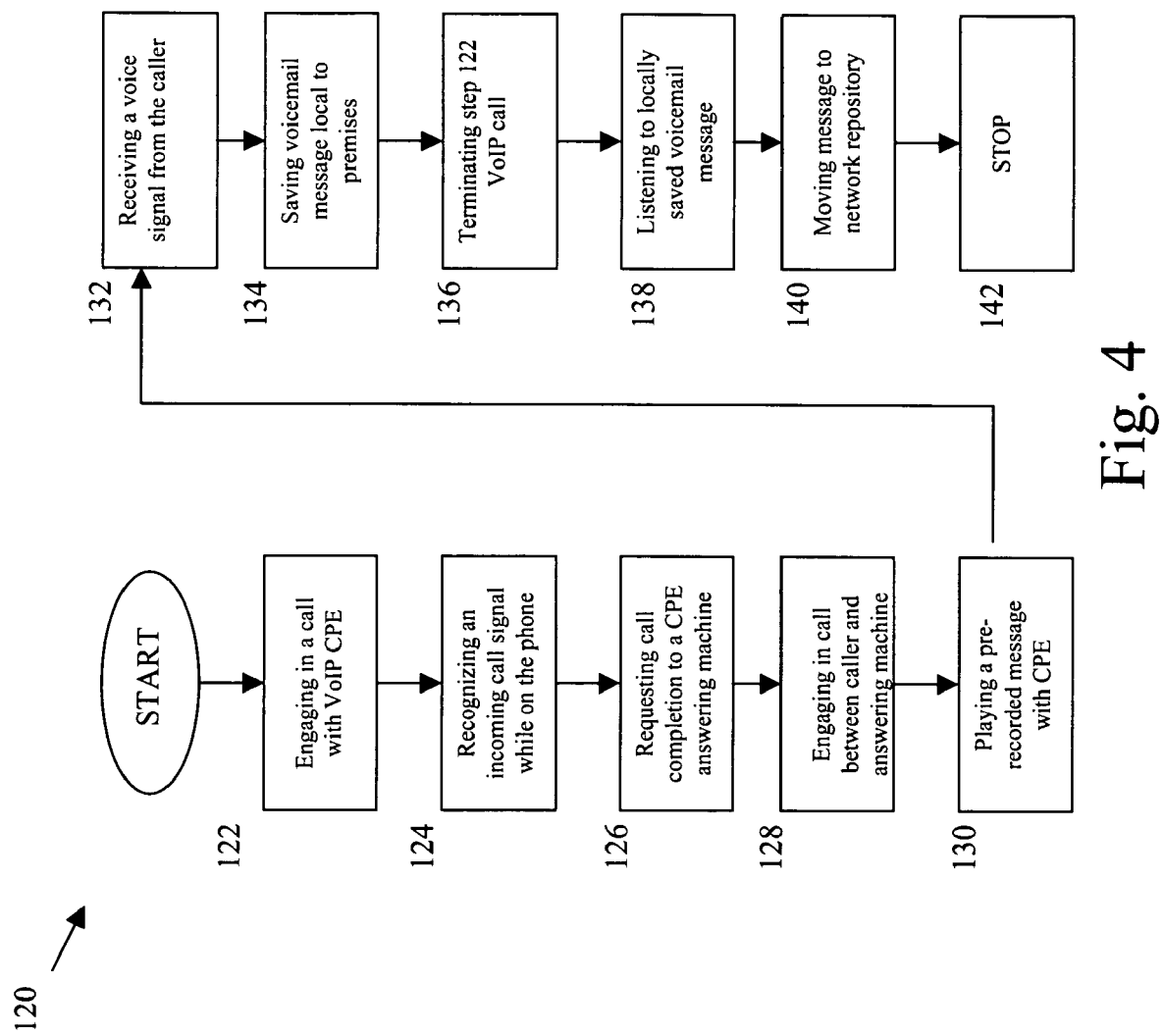

SYSTEM AND METHOD FOR MANAGING MESSAGES IN A PACKETIZED VOICE ENVIRONMENT

FIELD OF THE INVENTION

The present disclosure relates generally to packetized telephony, and more specifically to a system and method for managing messages in a packetized voice environment.

BACKGROUND

Packetized voice offerings like Voice over Internet Protocol (VoIP) have become increasingly popular in recent years. In general, VoIP offerings provide for the transport of voice streams over a data network using data transport protocols more commonly associated with the Public Internet, namely User Datagram Protocol/Internet Protocol (UPD/IP) suite.

As packetized voice offerings have begun to blur the line between voice traffic and data traffic, services like voicemail and messaging have migrated into the network. Several telephony providers now manage these offerings at a centralized messaging system located in network. If a caller fails to reach a called party, the caller may simply be routed to a unified messaging center and prompted to leave a message.

While such a solution may provide improved efficiencies for the network operator and/or service provider, many users may find the available solutions wanting.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 4 shows a flow diagram for a technique that may be used to implement teachings of the present disclosure.

DETAILED DESCRIPTION OF THE DRAWINGS

Figure 1:
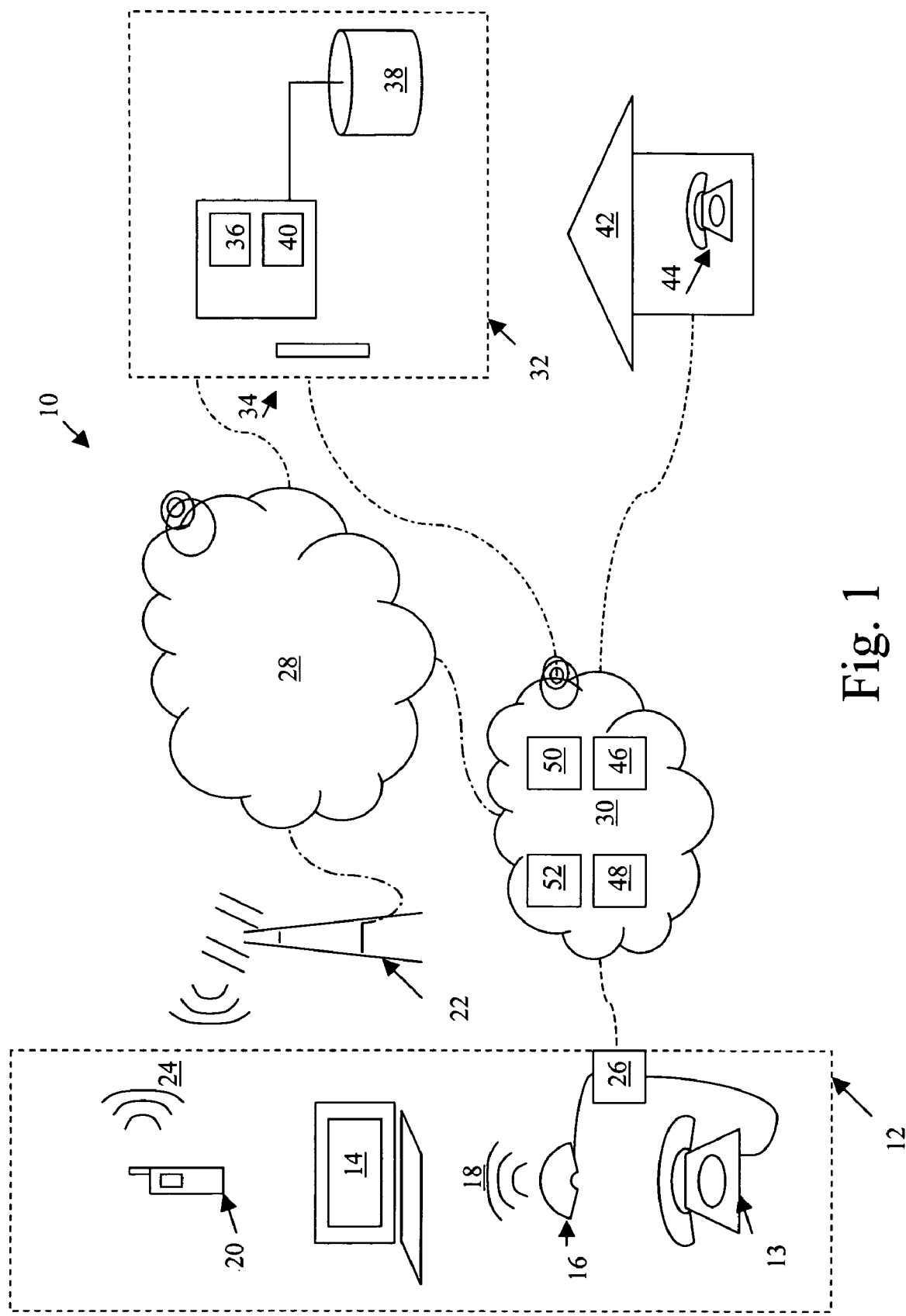
FIG. 1 presents a block diagram of a message management system that incorporates teachings of the present disclosure.

As VoIP deployments expand into the residential telephony market, voicemail and messaging services may begin to move in-network. As such, a call to a VoIP subscriber that goes unanswered may get routed to a centralized unified messaging center. While such a solution may represent an improvement in network efficiency, some subscribers may want to have more control over the incoming call.

The present disclosure describes techniques for facilitating a higher degree of call control in a packetized voice system. While the following discussion focuses on VoIP offerings implemented in a communication network that utilizes the Session Initiation Protocol (SIP), the teachings may also be applied in other networks and with other protocols and call control schemas. From a high level, a system and/or method incorporating teachings of the present disclosure may provide a packetized voice subscriber with the ability to screen incoming calls, to store important messages locally, and/or to better manage privacy issues surrounding stored messages.

In practice, these capabilities may be supported by one or more SIP applications. SIP offers a text-based description protocol that allows two systems to describe a communicated media stream. The description itself may include information relating to authentication, caller ID, media stream parameters, and/or other information for supporting the call between two endpoints.

In operation, a call intended for a dialed number may be received in network on a channel or other communication link. A call receipt process may begin in order to learn what to do with and where to "send" the received call. For example, a dialed number, or some other type of device address may be translated into a variable for use during call processing activities. The processing activities may include, for example, a number of match tests performed against the variable. These match tests may be executed until a match is found.

A found match may have several allocated operators. These operators often have a priority indicator telling a processing server in what order the server should attempt to execute the applications associated with the found match. If, for example, there are three operations associated with a given match, a SIP-based system may prioritize the operations by giving them respective priority values of 1, 2, and 3—telling the processing server to try the priority 1 operation first. In some embodiments, the operators and/or their respective priority indicators may be altered by a subscriber in near real time. A subscriber may want "dial home" to be the number one priority during one window of time and "dial voicemail" to be the number one priority during some other window of time.

In one embodiment, if an inbound call is directed to a dialed number, 345-6789, a variable value of 6789 may be assigned to the dialed number. The variable may then be compared against a list of match statements to determine how to handle the call. If the priority 1 application for the match is "Dial home," this application may be performed.

The Dial application may direct the processing server to ring a remote channel and then connect the two channels together if a connect call signal is received from the called device. As mentioned above, if a Dial application gets an answer on the remote channel, the two callers may be bridged together and the call may proceed. After the call, one or both parties to the call may "hang up". When this occurs, the Dial routine may exit and the priority list may stop executing.

In some cases, there may be no answer to the call launched by the Dial application. If, for example, the Dial application rings a remote phone for some set amount of time, which may be specified in a Dial statement, and there is no answer, Dial may exit and the next priority application may be executed. In a system incorporating teachings of the present disclosure, the next application may include both a Continued Dial application and a Copy to Network Voicemail application. For example, a called party may have a piece of VoIP Customer Premises Equipment (CPE) that acts as a premises answering machine. The caller may be connected to the CPE and hear an "unavailable" greeting for the called party. The greeting may prompt the caller to leave a message, which may be stored locally on the CPE and copied in-network at a centralized messaging center. Depending upon implementation detail, the copying may occur simultaneously or at some later time. Moreover, the copying may occur automatically and/or at the direction of the called party subscriber.

As indicated above, if a SIP application, like the Dial application, proves ineffective, a SIP processing server may need to move to a next or higher level priority application. In practice, an ineffective Dial application may be exited and an adder value may be applied to the existing priority value—allowing the processing server to move ahead to a new priority level.

A service provider may elect to provide SIP-like functionality using several different architectures. Depending upon implementation detail, some SIP components may be combination modules or discrete modules, implemented in software, hardware, and/or firmware. From a high level, many SIP system components may be acting as or executing user agents (UA) and/or SIP servers.

For example, telephony devices may include user agents (UAs), which may be a combination of a user agent client (UAC) and a user agent server (UAS). In operation, a UAC entity may be permitted to create an original request, and a UAS may represent one or more server types capable of receiving requests and sending back responses. A SIP UA may be implemented in hardware such as an IP phone or a gateway component or in software such as a softphone application running on a computing platform.

Various SIP UAs may connect to one another with the help of a collection of SIP servers. In many cases, these SIP servers may be executing on centralized hosts of a distributed communication network. Again depending upon implementation detail, a large SIP system may include several different kinds of servers such as Location Servers, Proxy Servers, Redirect Servers, and Registrar Servers.

In operation, a Location Server may be used by a Redirect server or a Proxy Server to obtain information about a called party's location. A Proxy Server may represent an intermediary program that acts as both a server and a client for the purpose of making requests on behalf of other clients. Such requests may be serviced internally or transferred to other servers. In some cases, a Proxy Server may interpret and then rewrite a request message before forwarding it. A Redirect Server may accept a SIP request, map the address into zero or more new addresses, and return these addresses to the client. In some cases, the Redirect Server may be designed such that it does not accept calls but does generate SIP responses that instruct a UAC to contact another SIP entity. As the name implies, a Registrar Server may accept REGISTER requests and may be co-located with a Proxy or Redirect server to offer these servers some level of location server-like assistance.

As referenced above, a SIP system may facilitate providing enhanced call control features that incorporate teachings of the present disclosure. Many features, in addition to the above-described features may be better understood in connection with the Figures. As mentioned above, FIG. 1 presents a block diagram of a message management system 10 that incorporates teachings of the present disclosure. As depicted, system 10 includes a remote physical location indicated at 12 that contains various computing devices accessible by a user or subscriber. The devices may include, for example, a wired telephone 13 (which may be a Plain Old Telephony Service (POTS) telephone and/or a VoIP telephone), a laptop computer 14, and a wireless telephone 20, each of which may be capable of executing a SIP UA. Moreover, each of these devices may possess an effective identifier, which could include an IP address, a telephone number, a Media Access Control address, a Data Link Control (DLC) address, and/or some other addressable identifier.

In the embodiment of FIG. 1, laptop 14 may a have short-range or local area wireless transceiver that serves to connect laptop 14 to LAN hub 16 across wireless link 18. As depicted, LAN hub 16 may communicate with one or more local devices across a wireless link. In some embodiments, LAN hub 16 may communicate across wired links. Moreover, LAN hub 16 may act as an EtherSwitch or router and may utilize a backhaul at least partially provided by a service line data connection to a broadband network interface device like modem 26. Depending upon implementation detail, modem 26 may be configured to communicate digital voice over Internet Protocol data to an Internet Protocol network like the Public Internet.

In a particular example, modem 26 may be an asynchronous digital subscriber line (ADSL) modem, a digital subscriber line (DSL) modem, a satellite modem, a fiber optic termination point, a cable modem, or other high-speed interface.

Within system 10, wireless phone 20 may also be "connected" to a cellular network node 22 across a wireless link 24, which may be, for example, a General Packet Radio Service (GPRS) or some form of Enhanced Data GSM Environment (EDGE). Wireless links 18 and 24 may be implemented in several ways. The link type may depend on the electronic components associated with the given wireless devices and wireless LAN hubs. The wireless computing device and/or wireless hub (Wireless Enabled Devices) may include any of several different components. For example, a Wireless Enabled Device may have a wireless wide area transceiver, which may be part of a multi-device platform for communicating data using radio frequency (RF) technology across a large geographic area. This platform may for example, be a GPRS, EDGE, or 3GSM (define) platform, and may include multiple integrated circuit (IC) devices or a single IC device.

A Wireless Enabled Device may also have a wireless local area transceiver that communicates using spread-spectrum radio waves in a 2.4 GHz range, 5 GHz range, or other suitable range. The wireless local area transceiver may be part of a multi-device or single device platform and may facilitate communication of data using low-power RF technology across a small geographic area. For example, if the wireless local area transceiver includes a Bluetooth transceiver, the transceiver may have a communication range with an approximate radius of twenty-five to one hundred feet. If the wireless local area transceiver includes an 802.11(x) transceiver, such as an 802.11(a)(b) or (g), the transceiver may have a communication range with an approximate radius of one hundred fifty to one thousand feet.

As shown in FIG. 1, LAN hub 16 may represent an 802.11 (x) embodiment, which may in some cases be referred to as a hotspot or access point. And, as mentioned above, LAN hub 16 may be communicatively coupled to modem 26, which may be capable of connecting hub 16 to a broader network, like Public Internet 28. As shown, both laptop 14 and wireless phone 20 may be ultimately coupled to Public Internet 28. Laptop 14 may connect via link 18 to hub 16 and via modem 26 to a service provider network 30, which may facilitate connection to Public Internet 28. In some embodiments, network 30 may be a cable network, and modem 26 may include a cable modem. As depicted, network 30 may be a Public Switched Telephone Network (PSTN), and modem 26 may include an xDSL modem. While modem 26 and hub 16 are depicted as stand alone and discrete devices, they may also be combined into a single device.

In practice, the information communicated across the various links of system 10 may be compressed and/or encrypted prior to communication. Communication may be at least partially via a circuit-switched network like the PSTN, a frame-based network like Fibre Channel, or a packet-switched network that may communicate using Transmission Control Protocol/Internet Protocol ("TCP/IP") and/or User Datagram Protocol/Internet Protocol ("UDP/IP") packets like Internet 28. The physical medium making up at least some portion of the various links may be coaxial cable, fiber, twisted pair, an air interface, other, or a combination thereof. In some embodiments, network access links may provide a broadband connection facilitated by an xDSL modem, a cable modem, an 802.11x device, some other broadband wireless linking device, or a combination thereof. The broadband connection may include a link providing data rates greater than 56 Kbps. Other broadband connections may provide data rates greater than 144 Kbps, 256 Kbps, 500 Kbps, 1.0 Mbps, 1.4 Mbps, or faster.

In a preferred embodiment of system 10, a user may maintain a network connection from premises 12 to network 30 and way subscribe to a VoIP service. In some embodiments, the user may make use of a network-based messaging system 32 far storing messages like voicemail messages, electronic mail messages, mobile alert messages, Short Messaging Service messages (SMS), Enhanced Messaging Service messages (EMS), and/or Multi-media Messaging Service messages (MMS). As depicted, system 32 may be communicatively coupled to service provider network 30. In operation, system 32 may include a gateway 34 that receives queries, calls, and/or messages from other system 10 devices. Gateway 34 may communicate with a memory engine 36 that manages and maintains information stored in memory 38. The stored information may include, for example, unified mailboxes for messaging subscribers. In some embodiments, memory engine 36 may also include an updated engine 40 that allows subscribers to modify, read from, copy from, and/or write to, the mailboxes.

In operation of system 10, a calling party at premises 42 may use VoIP telephone 44 to place a call to a called party staying at location 12, which may be a home, an office, a hotel, and/or some other location. The VoIP call may be held at a SIP server 46 located within network 30. SIP server 46 may utilize a location server like server 48 to determine an appropriate device address for the called party. The device address may be, for example, a telephone number, an IP address, a MAC address, and/or some other effective identifier.

In the embodiment of FIG. 1, the device address may identify a device of location 12. For example, the device address may be associated with a softphone executing on laptop 14. As such, SIP server 46 may call the softphone and wait for a complete call request. In some cases, the called party may be "on" the softphone and/or unavailable to receive the call from the calling party. In some embodiments, SIP server 46 may move to a second level priority application and route the calling party to system 32. In some cases, SIP Server 46 may have a second level priority that involves the direct calling of a SIP UA associated with a premises based answering machine module executing on a device of location 12.

In such an embodiment, the answering machine module may indicate its willingness to accept the call by issuing a SIP complete call request. Moreover, the calling party may be bridged to the answering machine module. The calling party may be played an announcement and may leave a message that is stored locally at location 12.

In preferred embodiments, network 30 may also include a modification server 50 and a messaging server 52. Modification server 50 may be designed to allow a subscriber to call in and update the manner in which incoming calls to the subscriber are to be handled. For example, the subscriber may change the order of to-be-tried call completions and/or the device addresses to be tried. Messaging server 52 may maintain a list indicating whether a given subscriber utilizes a voicemail box and whether the utilized voicemail box is network-based and/or premises-based.

Figure 2:
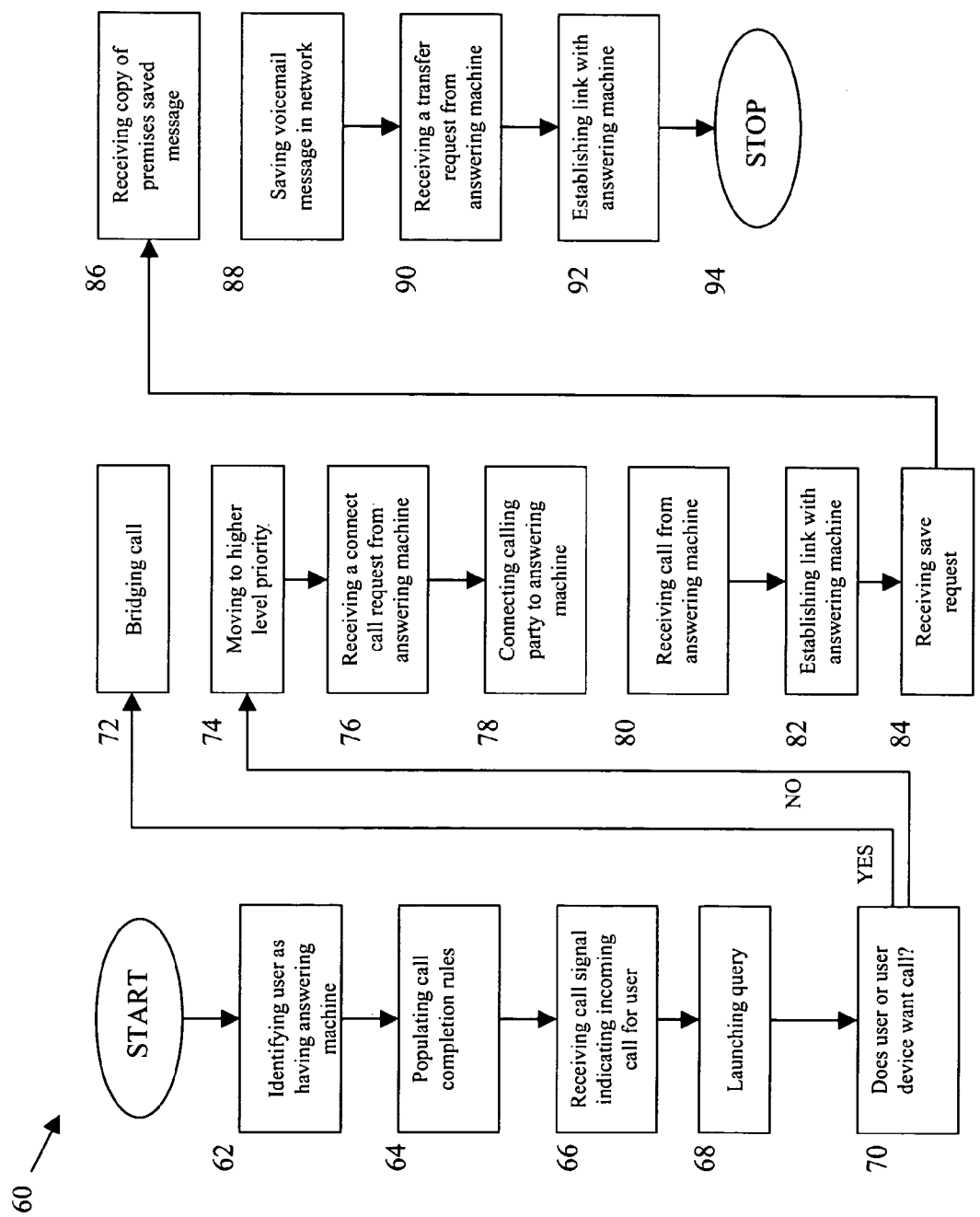
FIG. 2 shows a flow diagram for a call control technique that may be used to implement teachings of the present disclosure.

The operation of a system like system 10 may be better understood by reference to additional figures. As mentioned above, FIG. 2 shows a flow diagram for a technique 60 that may be used to implement teachings of the present disclosure. At step 62, a VoIP subscriber may be identified as someone who has access to a premises-based voicemail system. A memory may be populated with a subscriber identifier, which may be a ten-digit telephone number and/or an Internet Protocol or MAC address associated with the premises-based voicemail system. The memory may also be populated with updateable call completion rules for managing incoming calls to the subscriber and voicemail system addressing information.

In some embodiments, the addressing information may include a telephone number, an Internet Protocol address, a data network connection rule, and/or some other address. The addressing information may also be updateable and represent a then-current mechanism for contacting a subscriber voicemail system. At step 64, subscriber call completion rules may be populated. This population may represent an initial population or a subsequent modification of earlier rules. In practice, a subscriber may not want to save voice messages at the subscriber's premises every time there is an unanswered incoming call.

At step 66, a signal may be received indicating a desire to complete a call or send a message to the subscriber. In response to the message, a query may be sent to a SIP user agent executing on a computing platform associated with the called party subscriber. The query may be launched at step 68 and may result in the ringing of a piece of CPE at the subscriber's premises. If the call is answered at step 70, a signal indicating a desire to complete the VoIP call from the calling party to called party may be received and the call may be bridged at step 72.

If the call is unanswered at step 70, a network-based SIP server may move to a level two priority and send, at step 74, a SIP query to a different user agent executing on a computing platform associated with a called party answering machine module. At step 76, a connect call request from the answering machine module may be received, and the calling party may be connected to the answering machine module at step 78.

As mentioned above in relation to step 62, a system executing technique 60 may maintain information about the called party in a network repository. In some embodiments, the information may include a mailbox address for a network-based voicemail box. At step 80, a call from the answering machine module may be received, and, at step 82, a communication link with the answering machine module may be established. At step 84, a save request may be received from the answering machine module requesting that a copy of a voice message left by an earlier calling party at the answering machine module be saved in the network-based voicemail box. At step 86, a copy of the voice message may be communicated to the network-based voicemail box.

Similarly, at step 88 a different voicemail message may be saved originally in the network-based voicemail box. At step 90, a transfer request from the subscriber may be received requesting that a copy of the different voicemail message be communicated to the answering machine module. In response to the request and at step 92, a link may be established between an answering machine module communication channel and a network-based voicemail box channel to facilitate communication of the different voicemail message to the answering machine module. Technique 60 may then progress to stop at step 94. Though technique 60 has been described as having a sequence of steps, additional steps may be added, steps may be removed, steps may be re-ordered, and/or looped, without departing from the teachings of the present disclosure.

As mentioned above, FIG. 3 presents a simplified block diagram for a system 84 that incorporates teachings of the present disclosure to present an enhanced level of VoIP call control. System 96 includes a laptop computer 98, which may rely on connection 100 to provide at least a portion of a link to a data network like the Public Internet. Connection 100 may, for example, connect laptop 98 to a broadband network access device and/or a premises network, which may in turn be communicatively coupled to a wide area network like the PSTN or a cable network.

A web browser application may be running on laptop 98 and may present a user of the laptop with a navigation window 102 and a display pane 104. In operation, a user may type a Uniform Resource Locator (URL) into a portion of navigation window 102 and a page having that URL may be communicated to laptop 98 and presented within display pane 104. When the laptop sends a request for the page having the input URL, a network element of the data network may recognize in the request an address to which it should send the page.

The presence of a network connection at least partially provided via connection 100 may be recognized by a component of laptop 98. For example, laptop 98 may include a computer-readable medium 106 storing computer-readable data. Execution of some part of this data by a processor like processor 108 may allow laptop 98 to act as VoIP softphone and a premises-based answering machine module, which may operate in association with the VoIP telephone. For example, a software version of a VoIP answering machine may be able to initiate an answering of an incoming VoIP call, a playing of a recorded announcement to a calling party, and a saving of a message from the calling party. In some embodiments, the answering machine functionality may occur while a user is operating the softphone—allowing the user to simultaneously engage in a VoIP call and receive a voicemail.

Figure 3:
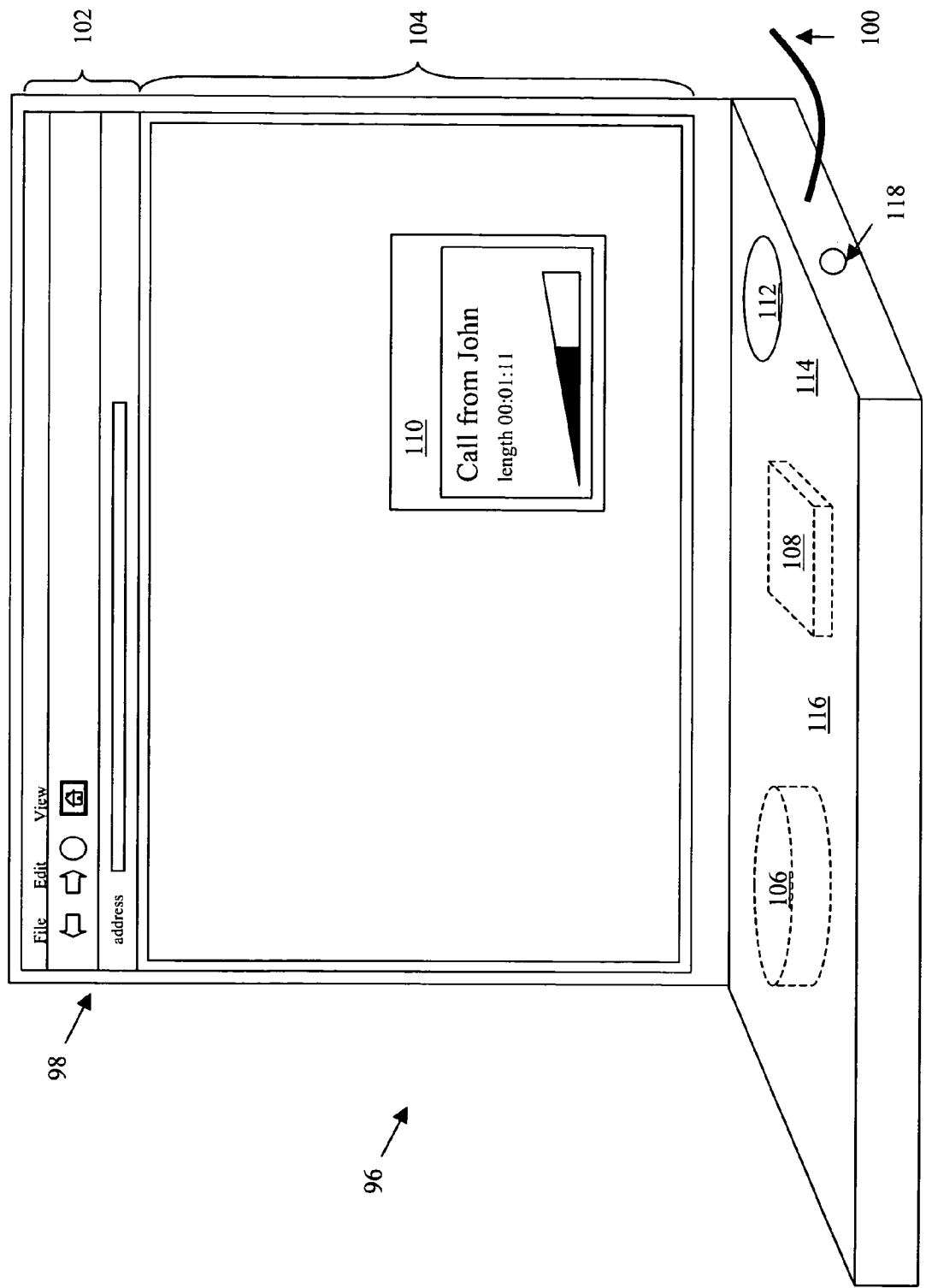
FIG. 3 presents a simplified block diagram for a system that incorporates teachings of the present disclosure to provide an enhanced level of VoIP call control to the called party.

Laptop 98 may also be capable of initiating presentation of GUI element 110 that may, as depicted, present call information to the user. As shown, GUI element 110 may indicate to the user that a call from "John" has been received by the answering machine module and that "John" is currently leaving a message with a length of one minute and eleven seconds. In some embodiments, the user may be listening to the message while it is being saved or later with speaker assembly 112, which may be designed to interact with a housing component 114 of laptop 98. In some embodiments and as shown in FIG. 3, GUI element 110 may provide a sloped and shaded triangle or some other indication of the current volume setting. As depicted, housing component 114 may also at least partially form an interior cavity that houses processor 108 and a memory like medium 106, which may be RAM, ROM, flash, and/or some other appropriate form of memory.

Though system 96 shows an integrated system where a single computer embodies a computer, a VoIP telephone, and a software implemented answering machine module, other form factors and designs may be employed to practice teachings of the present disclosure. A system designer may elect to utilize a stand alone VoIP telephone connected to a stand alone answering machine module that has its own housing. The connection may be fixed or removable. For example, an answering machine module may have a Universal Serial Bus (USB) interface capable of being plugged into a mating USB interface of a VoIP telephone. Other interface designs may include, for example, an 802.11(x) interface, a Bluetooth interface, a Type I, II, and/or III Personal Computer Memory Card International Association (PCMCIA) card and slot interface, some other memory card form factor interface, a Firewire interface, and/or an appropriate parallel bus interface.

With such a design, the answering machine module may be relatively portable. It may be plugged into a VoIP telephone having one telephone number and later plugged into a different VoIP telephony device having a different telephone number. In the depicted system of FIG. 3, for example, a discrete answering machine module may be plugged into laptop 98 via interface 118, which may be a USB interface. With reference to FIG. 1, a designer may also elect to provide a removable module and/or build an answering machine module into one or more of the devices located at location 12.

Consideration of FIG. 4 may assist in providing a better understanding of how a user may make use of a system like system 96. FIG. 4 shows a flow diagram for a technique 120 that may be used to implement teachings of the present disclosure. At step 122, a user may be engaging in a VoIP or other telephone call. While engaged in the call, a system like system 96 of FIG. 3 may, at step 124, recognize an incoming call signal. For example, a computing platform at the user's premises may be executing a SIP UA, and the SIP UA may recognize a query from a service provider network node indicating that a calling party seeks connection.

At step 126, a piece of CPE may request that the incoming call be completed to a specific device. For example, a VoIP telephone station engaged in another call may respond to the query and ask that the call be completed to a premises located answering machine module. Depending upon design criteria, the actual process of completing the call to the answering machine may involve additional query and response cycles between pieces of CPE and the service provider network node. However accomplished, the caller and the answering machine module may engage in a communication at step 128. At step 130, the answering machine module may play a pre-recorded announcement to the caller, and at step 132, the answering machine module may receive a voice signal indicating an utterance of the caller.

At step 134, a copy of the caller's voicemail message may be saved in a memory resident at the customer premises. In an embodiment in which the voicemail message was left while the user was engaged in another call, the user may terminate the other call at step 136 and listen to the recoded voicemail message at step 138. In some embodiments, the user may elect to move and/or copy the locally saved voicemail message to a network-based repository at step 140. Technique 120 may then progress to stop at step 142. As with technique 60, technique 120 has been described as having a sequence of steps. Additional steps may be added, steps may be removed, steps may be re-ordered, and/or looped, all without departing from the teachings of the present disclosure.

It should also be understood that the incoming call signal referenced above may arrive via a data link connecting a piece of CPE to a broader network. The broader network may be a SIP-enabled network capable of communicating packetized data such as Internet Protocol (IP) data packets, and the data link may include, for example, a Global Packet Radio Services (GPRS) link, an Enhanced Data GSM Environment (EDGE) link, a cable modem link, a satellite link, and a Digital Subscriber Line (DSL) link.

As mentioned above, a user may want an incoming call to go to a local answering machine and/or a unified messaging service. In some embodiments, the subscriber may also want to receive a text-based and/or audio-based version of the message at a different device. In operation of systems like systems 10 and 96, nodes, servers, modules, agents, platforms, mechanisms, and/or engines may be implemented in several ways. For example, they may include hardware, firmware, software, executable code, and/or a combination thereof. Platforms, which may be implementing nodes, servers, modules, mechanisms, and/or engines, may be made up of a microprocessor, a personal computer, a computer, some other computing device, or a collection thereof. Though nodes, servers, modules, agents, platforms, mechanisms, and/or engines may have been described as individual elements, one or more may be combined and designed to operate as a single element.

In various embodiments, the communication devices described herein may take forms including computers, laptops, desktops, wireless and cordless phones, pagers, personal digital assistants with built in communications circuitries, cellular telephones, mobile telephones, and other electronic devices having processing and network access capabilities.

The methods and systems described herein provide for an adaptable implementation. Although certain embodiments have been described using specific examples, it will be apparent to those skilled in the art that the invention is not limited to these few examples. Additionally, various types of wireless transceivers, transmitters, receivers, and protocols are currently available which could be suitable for use in employing the methods as taught herein. Note also, that although certain illustrative embodiments have been shown and described in detail herein, along with certain variants thereof, many other varied embodiments may be constructed by those skilled in the art.

The benefits, advantages, solutions to problems, and any element(s) that may cause any benefit, advantage, or solution to occur or become more pronounced are not to be construed as a critical, required, or essential feature or element of the present invention. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. A message management system comprising:
   a Voice over Internet Protocol (VoIP) telephone;
   a broadband network access device communicatively coupled to an interface of the VoIP telephone and operable to form at least a portion of a link communicatively coupling the VoIP telephone to a remote broadband network node;
   a premises-based answering machine module associated with the VoIP telephone, the premises-based answering machine module comprising a memory populated with a subscriber identifier and updatable call completion rules to manage incoming calls to a subscriber, the updatable call completion rules including a particular updatable call completion rule to selectively save voice messages at a premises of a subscriber, the premises-based answering machine module operable to initiate answering of an incoming VoIP call to the VoIP telephone, playing of a recorded announcement to a calling party, saving a message from the calling party, and presenting a graphical user interface (GUI) element to present information about the incoming VoIP call on a display, wherein the premises-based answering machine module has an address and the VoIP telephone has a different address; and
   a housing component of the VoIP telephone, the housing component at least partially defining an interior cavity and an exterior surface, wherein at least a portion of the premises-based answering machine module resides in the interior cavity.

2. The system of claim 1, further comprising a selector responsive to a user interface, the selector operable to initiate placing the answering machine module in an active state in response to receiving an enable signal via the user interface.

3. The system of claim 1, wherein the answering machine module memory is a removable memory.

4. The system of claim 1, wherein the premises-based answering machine module has a first internet protocol address and the VoIP telephone has a second internet protocol address.

5. The system of claim 1, wherein the address has a type selected from a group consisting of an Internet Protocol address, a telephone number, a Media Access Control address, and a Data Link Control (DLC) address.

6. The system of claim 1,
   wherein the housing component of the VoIP telephone at least partially defines an interconnect location for communicatively coupling an element of the VoIP telephone with a portion of the answering machine module; and
   further comprising a module mechanism having an output, the module mechanism operable to initiate communication of an engaged signal via the output in response to determining that the element of the VoIP telephone is coupled with the portion of the answering machine.

7. The system of claim 6, wherein the broadband network access device is operable to initiate communication of an active local answering machine signal in response to the engaged signal.

8. The system of claim 1, wherein the premises-based answering machine module is further operable to initiate a transfer of a copy of a previously stored voicemail message from a network-based voicemail box to the premises-based answering machine module.

9. The system of claim 1, further comprising:
   a Session Initiation Protocol user agent application; and
   wherein the premises-based answering machine module is further operable to execute the Session Initiation Protocol user agent.

10. The system of claim 1, wherein the premises-based answering machine module is operable to initiate saving the message from the calling party on a memory device of the premises-based answering machine module and to communicate a copy of the saved message to a network-based voicemail box.

11. The system of claim 1, wherein the updatable call completion rules represent a subsequent modification of earlier rules.

12. A method comprising:
   invoking an updatable call completion rule to selectively save voice messages at a premises-based answering machine module associated with a Voice over Internet Protocol (VoIP) telephone, wherein the premises-based answering machine module and the VoIP telephone are located in the same housing and the premises-based answering machine module has an address and the VoIP telephone has a different address, wherein the premises-based answering machine module includes a memory populated with a subscriber identifier and updatable call completion rules to manage incoming calls to a subscriber, the updatable call completion rules including a particular updatable call completion rule to selectively save voice messages at a premises of a subscriber and the premises-based answering machine module is operable to:

initiate answering of an incoming VoIP call to the VoIP telephone;

play a recorded announcement to a calling party;

save a message from the calling party; and present a graphical user interface (GUI) element including information about the incoming VoIP call on a display.

13. The method of claim 12, wherein the particular updatable call completion rule represents a subsequent modification of an earlier rule.

14. The method of claim 12, wherein at least a portion of the premises-based answering machine module resides in an interior cavity of the VoIP telephone.

\* \* \* \* \*